United States Patent Office 3,829,523
Patented Aug. 13, 1974

3,829,523
OLEFIN DISPROPORTIONATION
David M. Singleton, Richmond, Calif., assignor to
Shell Oil Company, Houston, Tex.
No Drawing. Filed July 22, 1969, Ser. No. 843,764
Int. Cl. C07c 3/62
U.S. Cl. 260—683 D
2 Claims

ABSTRACT OF THE DISCLOSURE

Olefins are disproportionated with a catalyst produced by contacting (a) molybdenum or tungsten oxide supported on an inorganic oxide solid and (b) an alkyl aluminum halide.

BACKGROUND OF THE INVENTION

Reactions of olefinic molecules in the presence of metal-containing catalysts to produce other olefinic molecules are known in the art, such as "disproportionation." A typical olefin disproportionation process is illustrated by U.S. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. 3,261,879 to produce ethylene and butylenes.

A variation of this disproportionation process, which might be termed "reverse disproportionation" is illustrated by the Netherlands Patent Application 6514985 of British Petroleum Company, Limited, published May 20, 1966, wherein, in one modification, molecules of two dissimilar olefins are reacted to form two molecules of a single olefin product, e.g., ethylene and 2-butene react to form propylene.

Another variation of the process, being conveniently termed "ring opening disproportionation" to distinguish it from other variations, is disclosed by Netherlands Patent Application 6702703 of Phillips Petroleum Company, published Aug. 24, 1967, wherein a cyclic olefin and an acylic olefin react to form a single product molecule. For example, ethylene reacts with cyclopentene by "ring opening disproportionation" to produce 1,6-heptadiene.

The term "disproportionation process" as herein employed is meant to include all variations of disproportionation reactions.

A variety of catalyst have been employed for conducting disproportionation reactions. One type of disproportionation catalyst is that of Peters et al., U.S. 2,963,447, which comprises a heterogeneous catalyst composition produced by contacting molybdenum oxide supported on an alumina with an alkyl aluminum compound. Although this catalyst composition is active at elevated temperatures, it is essentially inactive at substantially room temperature.

SUMMARY OF THE INVENTION

It has now been found that an improved process of disproportionating olefins is obtained through the use of a catalyst produced by contacting a molybdenum or tungsten oxide supported on an inorganic oxide solid and an alkyl aluminum halide. The catalyst is catalytically active for disproportionating olefins at room temperature and is a heterogeneous composition, i.e., substantially insoluble in the disproportionation reaction mixture.

DESCRIPTION OF THE EMBODIMENTS

The Olefinic Reactants

The process of the invention comprises the contacting of two olefinic reactants, which may be the same olefin or different olefins, in the presence of disproportionation catalysts of the invention. The olefinic reactant is acyclic, monocyclic or polycyclic of up to four rings, preferably of two rings, and is a monoolefin or is a polyolefinic reactant preferably of up to three non-conjugated carbon-carbon double bonds. When the olefinic reactant is cyclic, at least one ethylenic linkage is a portion of a carbocyclic ring of at least five carbon atoms.

A class of suitable acyclic olefinic reactants is represented by the formula (I)

$$RCH=CHR' \qquad (I)$$

wherein R and R' independently are hydrogen or alkyl of up to 18 carbon atoms with the total number of carbon atoms of the acyclic olefin, which total is herein termed "$n$," being no more than 30.

Ilustrative of acyclic olefinic reactants represented by formula (I) are propylene, 1-butene, 2-butene, 2-pentene, 3-hexene, 4-methyl-1-heptene, 2-decene, 6-dodecene, 3-tetradecene and 10-eicosene. In general, the preferred acyclic olefins are olefins of up to 20 carbon atoms, more preferably of up to 10 carbon atoms, and especially preferred are linear acyclic internal monoolefins, i.e., those olefins wherein both R and R' groups are n-alkyl.

A class of suitable cyclic olefinic reactants is represented by formula (II)

(II)

wherein A is a divalent hydrocarbon moiety of from three to ten carbons and of up to three ethylenic double bonds which are portions of carbocyclic rings and is selected so that the carbon atoms depicted in the formula (II) are members of a carbocyclic ring of at least five carbon atoms. The total number of carbon atoms of the cyclic olefinic reactant of formula (II) which total is herein termed "$m$," is therefore from five to twelve.

Illustrative monocyclic olefinic reactants of formula (II) include cyclopentene, cycloheptene, cyclooctene, cyclodecene, 1,5-cyclooctadiene, 1,6-cyclodecadiene and 1,5,9-cyclododecatriene, whereas illustrative polycyclic olefinic reactants are illustrated by bicyclo-(2.2.1)hepta-2,5-diene, bicyclo(2.2.1)hept-2-ene, tricyclo(4.2.1.0$^{2,5}$) non-7-ene, tricyclo(5.2.1.0$^{2,6}$)-deca - 3,8 - diene, bicyclo (2.2.2)oct-2-ene, bicyclo(2.2.2)octa-2,5-diene, bicyclo (3.3.0)oct-2-ene, dicyclopentadiene (3a,4,7,7a-tetrahydro-4,7-methanoindene), and quadricyclo(2.2.1.2$^{2,6}$.0$^{3,5}$)non-8-ene. Particularly satisfactory results are obtained when the cyclic olefinic reactant is a monocyclic or a bicyclic olefinic reactant of up to two ethylenic linkages and most preferred are the monocyclic, monoolefinic reactants of from five to eight carbon atoms.

Another class of suitable olefinic reactants are polyolefinic compounds containing two or more non-conjugated double bonds. Illustrative polyolefins are 1,4-polybutadiene, 1,4-polyisoprene and a copolymer of styrene and butadiene.

When two different olefinic reactants are employed in the disproportionation process, the molar ratio of one olefinic reactant to the other olefinic reactant is not critical, and up to a 20-fold excess, preferably up to a 10-fold excess of one olefinic reactant can be employed.

The Catalyst

The precise chemical form of the catalyst is not known with certainty and the catalyst is best defined in terms of its method of production. The catalyst results from the intimate contact of (a) a molybdenum or tungsten oxide supported on an inorganic oxide and (b) an alkyl aluminum halide.

The oxide of molybdenum and tungsten is preferably combined with the inorganic oxide solid in a high positive oxidation state, e.g., hexavalent molybdenum or hexavalent tungsten. The proportion of the molybdenum or tungsten oxide combined with the inorganic oxide can be varied, generally the inorganic oxide contains at least 0.1% by weight of the oxide of molybdenum or tungsten with amounts from about 0.2% to about 50% by weight being preferred, although still larger (major) proportions of molybdenum or tungsten oxide can be used.

The inorganic oxide solid comprises an inorganic oxide support containing a major proportion of silica or alumina. Such materials are commonly known as refractory oxides and include synthetic products as well as acid-treated clays or the crystalline alumina silicates known in the art as molecular sieves. Synthetic refractory oxides include silica, alumina, silica-alumina, silica-magnesia, silica-titania, alumina-titania, alumina-magnesia, boria-alumina, silica, alumina-zirconia, and silica-titania-zirconia. Preferred refractory oxide supports are alumina refractory oxides, that is, refractory oxides containing a substantial proportion of alumina, e.g., at least 10% by weight of alumina, preferably at least 25% by weight of alumina, and particularly preferred as the alumina refractory oxide is silica-alumina.

Suitable inorganic oxides are characterized by having a relatively large surface area in relation to their mass. Numerically, surface area will be expressed as square meters per gram (m.$^2$/g.). Generally, the inorganic oxide has a surface area of at least 10 m.$^2$/g., preferably the surface area is from 25 m.$^2$/g. to 800 m.$^2$/g. and more preferably the surface area is from 50 m.$^2$/g. to 700 m.$^2$/g.

The molybdenum or tungsten oxide is combined with the inorganic oxide support by any conventional method such as dry-mixing, co-gellation, impregnation, ion-exchange and the like.

The supported molybdenum or tungsten oxide composition employed as a catalyst precursor is optionally, and preferably, subject to a pretreatment prior to utilization in preparation of the catalyst. The precise method of pretreatment will depend in part upon the form of chemical combination in which the molybdenum or tungsten components are provided, but in general the pretreatment comprises heating an initially prepared molybdenum- or tungsten-containing inorganic oxide composition in an atmosphere of a non-reducing gas such as nitrogen, argon, carbon dioxide or oxygen-containing gas, e.g., air. One function served by this type of pretreatment operation is to convert the molybdenum and tungsten components into the form of the oxide if these components are not initially provided in these forms. For example, initial catalyst component such as ammonium tungstate and ammonium molybdate are converted to the corresponding oxide by heating in an non-reducing atmosphere. The pretreatment temperature is not critical and temperatures from about 350° C. to 800° C. are satisfactory.

In order to obtain the active catalyst composition of the invention, the molybdenum or tungsten oxide supported composition is treated with an alkyl aluminum halide. Suitable alkyl aluminum halides include alkyl aluminum sesquihalides represented by formula (III) and alkyl aluminum dihalides and dialkyl aluminum halides represented by formula (IV)

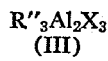    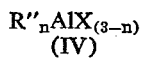
(III)                    (IV)

wherein R″ is alkyl of up to 8 carbon atoms, preferably of up to 4, X is halogen, preferably halogen of atomic number from 17 to 35 inclusive, i.e., the middle halogens chlorine and bromine, and $n$ is a whole number from 1 to 2 inclusive. Illustrative of alkyl aluminum sesquihalides of formula (III) are triethylaluminum sesquichloride and trimethylaluminum sesquibromide. Illustrative alkyl aluminum dihalides of formula (IV) are ethylaluminum dichloride, ethylaluminum dibromide, propylaluminum dichloride and butylaluminum diiodide. Illustrative dialkyl aluminum halides of formula (IV) are diethylaluminum chloride, dipropylaluminum bromide, and dioctylaluminum fluoride. In most applications, the particularly preferred class of alkyl aluminum halides are dialkyl aluminum halides and trialkyl aluminum sesquihalides, especially diethylaluminum chloride and triethylaluminum sesquichloride.

The ratio of supported molybdenum or tungsten composition to alkyl aluminum compounds used to form the disproportionation catalyst will in part depend upon the type of alkyl aluminum compound employed. It will be understood that dialkyl aluminum halides can be considered as having 2 moles of alkyl-aluminum bond for each mole of aluminum, whereas alkyl aluminum dihalides supply one mole of alkyl-aluminum bond per mole of aluminum and alkyl aluminum sesquihalides supply one and one-half moles of alkyl-aluminum bond per mole of aluminum. The quantity of the alkyl aluminum compound is selected so that the ratio of moles of alkyl aluminum bond provided by the alkyl aluminum compound to moles of molybdenum or tungsten oxide on the catalyst support is from about 1:1 to 20:1, preferably from about 2:1 to 10:1.

The alkyl aluminum compound is generally contacted with the molybdenum or tungsten oxide supported composition in the liquid phase in an inert reaction diluent which is liquid at contact temperature and pressure. Illustrative of suitable reaction diluents are hydrocarbons free from aliphatic unsaturation such as hexane, decane, cyclohexane, decahydronaphthalene, benzene and toluene. Preferred reaction diluents comprise the aliphatic saturated alkanes of from 6 to 12 carbon atoms. Contact temperatures of from about −15° C. to 50° C. are in general satisfactory. The pressure to be employed is not critical, e.g., pressures of from about 1 atmosphere to about 50 atmospheres are satisfactory.

Subsequent to the contacting of the supported molybdenum or tungsten composition and the alkyl aluminum compound, the resulting disproportionation catalyst is separated from the diluent, if desired, by conventional techniques such as filtration and decantation. In some instances, however, it is more convenient to employ directly the mixture of diluent and catalyst in the disproportionation process wherein the presence of a reaction diluent is also desired.

The amount of disproportionation catalyst is not critical. Generally, amounts of catalyst from about 0.1% by weight to 200% by weight based on olefinic reactant are satisfactory with amounts from about 1% by weight to about 100% by weight on the same basis being preferred.

In certain modifications of the process, it has been found desirable to include within the supported catalyst composition lesser amounts of an alkanoic acid as a catalyst promoter in addition to the active catalyst described above. Suitable alkanoic acids are lower alkanoic acids of from 1 to 4 carbon atoms such as formic acid, acetic acid, propionic acid and butyric acid. As previously stated, no alkanoic acid is required. When present, molar ratios of alkanoic acid to molybdenum or tungsten, calculated as the metal, of from about 0.1:1 to about 10:1 are satisfactory with amounts from about 0.3:1 to 3:1, calculated on the same basis being preferred. It is generally perferred to add the appropriate amount of alkanoic acid directly to the disproportionation reaction mixture.

Reaction Conditions

The disproportionation of the olefinically unsaturated compounds can with advantage be carried out at temperatures between −10 and 350° C. Temperatures between 10° C. and 150° C. are suitable, while temperatures between 20° C. and 75° C. are preferred. One of the advantages of the present disproportionation process is that it can be carried out at room temperature or slightly above, so that no heating equipment is required.

The disproportionation reaction can be carried out by contacting the olefins to be disproportionated with the catalyst in the liquid phase or the gas phase; depending on structure and molecular weight of the olefins, temperature and pressure.

The pressure during the disproportionation reaction may vary between wide limits. Pressures between 0.1 and 500 atm. are suitable; preferred pressures are between 0.5 and 250 atm. If possible, the process should be operated at a pressure which is atmospheric or nearly atmospheric, so that no vacuum or pressure apparatus is required.

If the reaction is carried out in the liquid phase, solvents or diluents for the reactants may be used. Aliphatic saturated hydrocarbons (e.g., pentane, hexane, cyclohexane, dodecane) and aromatic hydrocarbons such as benzene and toluene are suitable. If the reaction is carried out in the gaseous phase, diluents such as aliphatic hydrocarbons (e.g., methane, ethane and/or inert gases (e.g., nitrogen, carbon dioxide) may be present. Preferably the disproportionation reaction is effected in the substantial absence of reactive materials such as water and oxygen.

The length of time during which the olefinically unsaturated compounds to be disproportionated are contacted with the catalyst is not very critical, and may conveniently vary between 5 seconds and 24 hours, although longer and shorter contact times may be used. The contact time needed to obtain a reasonable yield of disproportionated products depends on several factors such as the activity of the catalyst, temperature, pressure and structure of the olefinically unsaturated compounds to be disproportionated.

The process of the invention is effected batchwise or continuously, with fixed catalyst beds, slurried catalysts, fluidized beds or by using any other conventional contacting technique. The solid disproportionation catalysts are applied in any appropriate form, for example as powders, flakes, pellets, spheres or extrudates.

The Products

According to the process of the invention two olefinic reactants are disproportionated to a product comprising olefin(s) having a total number of carbon atoms equal to the sum of the carbon atoms of the two olefinic reactants and having a number of ethylenic linkages equal to the sum of the ethylenic double bonds of the reactants.

One variation of the process comprises the disproportionation of two molecules of the same olefinic reactant. The reaction of two molecules of an acyclic olefin of formula (I) generally produces one olefin of a higher carbon number and one olefin of a lower carbon number as depicted in equation (1)

$$2\ RCH=CHR' \rightarrow RCH=CHR + R'CH=CHR' \quad (1)$$

wherein R and R' have the previously stated significance. If R and R' represent identical groups, it is appreciated that the disproportionation reaction will not cause any skeletal changes as the products RCH=CHR and

R'CH=CHR' will be equivalent to R'CH=CHR. By way of specific illustration, the reaction of two molecules of propylene produces ethylene and 2-butene. However, the reaction of two molecules of 2-butene produces two molecules of 2-butene. The reatcion of two molecules of cyclic olefinic reactant of formula (II), however, produces a single cyclic olefin produced as depicted in equation (2)

By way of specific illustration, the reaction of two molecules of cyclooctene produces 1,9-cyclohexadecadiene.

Another variation of the process comprises the disproportionation of two different acyclic olefinic reactants. By way of specific illustration, the reaction of 2-butene and 3-hexene produces two molecules of 2-pentene and the reaction of 2-butene with 1,4-polybutadiene produces two molecules of 1,4-polybutadiene having a molecular weight which is less than the molecular weight of the starting 1,4-polybutadiene.

Still another variation of the process is "ring-opening" disproportionation wherein an acyclic olefinic reactant represented by formula (I) is contacted with a cyclic olefinic reactant represented by formula (II). The product of "ring-opening" is a single olefinic compound with one less carbocyclic ring than the cyclic olefinic reactant of formula (II). In terms of the formulas (I) and (II), the product is represented by formula (III)

wherein R, R' and A have the previously stated significance. By way of specific illustration, from reaction of 2-butene and cyclopentene is produced 2,7-nonadiene. Other typical products include 2,8-decadiene produced by reaction of cyclohexene and 2-butene, 3,8-undecadiene produced from 3-hexene and cyclopentene, 1,5,9-decatriene produced by reaction of ethylene and 1,5-cyclooctadiene, and 1,4-divinylcyclohexane from ethylene and bicyclo(2.2.2)oct-2-ene.

In "ring-opening" disproportionation, the cyclic olefinic reactant is preferably a monocyclic or a bicyclic olefinic reactant of up to two ethylenic linkages and most preferably is a monocyclic, monoolefinic reactant of from five to eight carbon atoms, and the acyclic olefinic reactant is preferably an internal olefin which is symmetrical about the double bond, i.e., those olefins wherein both R and R' groups are alkyl and R=R'. The molar ratio of cyclic olefinic reactant to the acyclic olegn in ring-opening disproportionation is not critical, although it is frequently useful to employ a molar excess of the acyclic olefin. Molar ratios of acyclic olefin to cyclic olefinic reactant from about 1:1 to about 20:1 are satisfactory with molar ratios from about 1:1 to about 10:1 being preferred.

It is appreciated that an olefinic product produced by any variation of the disproportionation process can undergo further disproportionation with another olefin present in the reaction mixture. For example, 1,6-heptadiene produced from reaction of cyclopentene and ethylene can react with another molecule of cyclopentene to produce 1,6,11-dodecatriene, and 1,9-cyclohexadecadiene produced from the reaction of two molecules of cyclooctene can react with additional molecules of cyclooctene to give a high molecular weight monocyclic polyene.

The olefinic products, for the most part, have established utility as precursors of polymers, e.g., as the third component of ethylene-propylene terpolymers useful as synthetic elastomers. Cleavage of the ethylenic bonds of polyolefinic products as by ozonization produces di- or polycarboxylic acids which are reacted with diamines, e.g., hexamethylene-diamine, to form Nylons which are useful in synthetic fibers. The olefinic products are converted to secondary and tertiary alcohols as by sulfuric acid-catalyzed hydration. Alternatively, the olefinic products are converted by conventional "Oxo" processes to aldehydes which are hydrogenated with conventional catalysts to the corresponding alcohols. The $C_{12}$–$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

EXAMPLE I

A. A 84.5 g. sample of commercial silica-alumina (24% wt. alumina, surface area of about 200 m.²/g.) was contacted with a solution of ammonium metatungstate in 140 ml. of water. The impregnated silica-alumina was dried at 120° C. at then calcined at 480° C. for 16 hours. The resulting tungstic oxide-silica-alumina composition contained 23.9% by weight of tungsten, calculated as the metal.

B. A 1.5 g. sample of the tungstic oxide-silica-alumina composition of Example IA was contacted with 1 ml. of ethylaluminum dichloride in 2 ml. of n-heptane for 5 minutes at 25° C. and then filtered. A 0.5 g. sample of the ethylaluminum dichloride-treated composition was contacted with 5 ml. of 2-pentene in 10 ml. of benzene under nitrogen at about 25° C. for 2.5 hours. Gas liquid chromatographic analysis of the product mixture showed 88% conversion of 2-pentene to a product mixture comprising 2-butene, 2-pentene and 3 - hexene in the molar ratio of 1:2.8:1.

C. A 1.5 g. sample of the tungstic oxide-silica-alumina composition of Example IA was contacted with 9.5 ml. of triethylaluminum sesquichloride under an atmosphere of nitrogen for 5 minutes at 25° C. and then filtered. A 0.5 g. sample of the triethyaluminum sesquichloride-treated composition was contacted with 5 ml. of 2 - pentene in 10 ml. of benzene under an atmosphere of nitrogen at 25° C. for 1 hour. Gas liquid chromatagraphic analysis of the product mixture showed a 51% conversion of 2-pentene to a product mixture comprising 2-butene, 2 - pentene and 3 - hexene in the molar ratio of 1:6.4:1.

EXAMPLE II

A. A 39 g. sample of commercial silica-alumina (24% wt. alumina, surface area of about 200 m.$^2$/g.) was contacted with a solution of 14.9 g. of ammonium metatungstate in 70 ml. of water. The impregnated silica-alumina was dried at 120° C. and then calcined at 400° C. for 16 hours. The resulting tungsten oxide-silica-alumina composition contained 29.6% by weight of tungsten, calculated as the metal.

B. For comparison, a 0.5 g. sample of the tungsten oxide-silica-alumina composition of Example IIA was contacted with 5 g. of 2-pentene in 10 ml. of benzene at about 25° C. After a contact period of 25 hours, no disproportionation of the 2-pentene could be detected by gas chromatographic analysis.

EXAMPLE III

An alumina composition containing 15% wt. of molybdenum oxide is prepared by impregnating commercial alumina with an aqueous solution of ammonium paramolybdate, and subsequently drying and calcining the resulting alumina composition by a procedure similar to that of Example IA.

A sample of the above molybdenum oxide-alumina composition is treated with diethylaluminum chloride and then contacted with a mixture of cyclooctene and 2-butene by a procedure similar to that of Example IB. Gas chromatographic analysis of the product mixture shows a good yield of 2,10-dodecadiene arising from the ring opening disproportionation of cyclooctene with 2-butene.

EXAMPLE IV

A sample of the tungstic oxide-silica-alumina composition of Example IA is treated with diethylaluminum chloride and subsequently contacted with an equimolar mixture of 1-docosene and 2-butene at room temperature by a procedure similar to that of Example IB. Gas chromatographic analysis of the reaction mixture shows an olefinic product mixture comprising substantial amount of 2-tridecene.

EXAMPLE V

A sample of the tungstic oxide-silica-alumina composition of Example IA is treated with ethylaluminum dibromide and subsequently contacted with a solution of 2-butene and polybutadiene polymer (cis-1,4-content of 96% molecular weight of about 100,000) in toluene at room temperature by a procedure similar to that of Example IB. The resulting product mixture comprises a polybutadiene of lower-molecular-weight than the starting polymer.

EXAMPLE VI

An olefin disproportionation catalyst was prepared by treatment of a 10 g. sample of a tungsten oxide-silica-alumina composition (15.3% tungsten, calculated as the metal) with 5 ml. triethylaluminum sesquichloride in 15 ml. heptane by a procedure similar to that of Example IC.

A series of disproportionation experiments was conducted employing 0.5 g. of the above catalyst composition, 10 ml. of benzene, 5 ml. of 2-pentene and varying amounts of acetic acid, at a temperature of 25° C. for a period of 1 hour. The mole ratio of acetic acid to tungsten, calculated as the metal, employed the conversion of 2-pentene to 2-butene and 3-hexene obtained are provided in Table I.

TABLE I

| Run | Mole ratio of acetic acid to tungsten | Conversion of 2-pentene |
|---|---|---|
| 1 | 0 | 32 |
| 2 | 0.2 | 60 |
| 3 | 0.4 | 77 |
| 4 | 0.8 | 83 |
| 5 | 1.7 | 100 |
| 6 | 3.4 | 44 |
| 7 | 6.8 | 34 |

I claim as my invention:

1. A process of disproportionating two non-conjugated olefinic reactants to a product comprising olefin(s) having a total number of carbon atoms equal to the sum of the carbon atoms of the two olefinic reactants and having a number of ethylenic linkages equal to the sum of the ethylenic double bonds of the two olefinic reactants by contacting the two olefinic reactants at a temperature of from about 20° C. to about 75° C. in the presence of a catalyst produced by intimately contacting (a) an inorganic refractory oxide containing at least 0.1% by weight of molybdenum oxide or tungsten oxide, (b) an alkyl aluminum halide, the molar ratio of alkyl- aluminum bond to molybdenum oxide or tungsten oxide being from about 1:1 to 20:1 and (c) a lower alkanoic acid, the molar ratio of lower alkanoic acid per mole of tungsten or molybdenum, calculated as the metal, being from about 1:10 to 10:1.

2. The processed claim 1 wherein the alkanoic acid is acetic acid.

References Cited

UNITED STATES PATENTS 2,963,447 12/1960 Peters et al. _____ 252—430
3,535,401 10/1970 Calderon et al. _____ 260—683

DELBERT E. GANTZ, Primary Examiner

C. E. SPRESSER, Jr., Assistant Examiner

U.S. Cl. X.R.

260—666 A, 677 R, 680 R